US006892226B1

(12) United States Patent
Tso et al.

(10) Patent No.: US 6,892,226 B1
(45) Date of Patent: May 10, 2005

(54) SYSTEM FOR DELIVERY OF DYNAMIC CONTENT TO A CLIENT DEVICE

(75) Inventors: Michael Man-Hak Tso, Hillsboro, OR (US); David Alfred Romrell, Hillsboro, OR (US); Bikram Singh Bakshi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 909 days.

(21) Appl. No.: 09/000,709

(22) Filed: Dec. 30, 1997

Related U.S. Application Data
(60) Provisional application No. 60/041,001, filed on Mar. 27, 1997.

(51) Int. Cl.[7] ............................................. G06F 15/16
(52) U.S. Cl. ..................................................... 709/218
(58) Field of Search ................................ 709/217, 218, 709/219, 250, 227, 224, 245; 707/10, 14; 719/302, 303; 712/207; 705/14, 7; 715/501, 513

(56) References Cited

U.S. PATENT DOCUMENTS

| | | | | |
|---|---|---|---|---|
| 5,373,375 A | | 12/1994 | Weldy ........................ 358/523 |
| 5,517,612 A | | 5/1996 | Dwin et al. .................. 395/166 |
| 5,544,320 A | | 8/1996 | Konrad .................. 395/200.09 |
| 5,572,643 A | * | 11/1996 | Judson ........................ 709/218 |
| 5,583,763 A | * | 12/1996 | Atcheson et al. .............. 707/3 |
| 5,673,322 A | | 9/1997 | Pepe et al. ..................... 380/49 |
| 5,684,969 A | | 11/1997 | Ishida ........................ 395/342 |
| 5,701,451 A | | 12/1997 | Rogers et al. ............... 395/600 |
| 5,706,434 A | | 1/1998 | Kremen et al. ........ 395/200.09 |
| 5,710,884 A | * | 1/1998 | Dedrick ..................... 709/217 |
| 5,717,860 A | * | 2/1998 | Graber et al. ............... 709/227 |
| 5,717,923 A | * | 2/1998 | Dedrick ...................... 707/102 |
| 5,724,521 A | * | 3/1998 | Dedrick ........................ 705/26 |
| 5,724,556 A | | 3/1998 | Souder et al. ............... 395/500 |
| 5,727,159 A | | 3/1998 | Kikinis .................. 395/200.76 |
| 5,737,619 A | * | 4/1998 | Judson ........................ 707/500 |
| 5,742,905 A | | 4/1998 | Pepe et al. .................. 455/461 |
| 5,768,510 A | | 6/1998 | Gish ..................... 395/200.33 |
| 5,796,952 A | * | 8/1998 | Davis et al. ................. 709/224 |

(Continued)

OTHER PUBLICATIONS

Susac, Denis, "Cupcakes", about.com, Artificial Intelligence, pp. 1–5, Jan. 1998.*

Schott, Michele, "Online Advertising Report: Year in Review 1998 by AdKnowledge" www.engage.com, pp. 1–18, unknown date.*

Gudmundsson, O et al. "Commercialization of the World Wide Web: The Role of Cookies", www2000.ogsm.vanderbilt.edu, pp. 1–14, Dec. 1996.*

Voight, Joan, "Beyond the Banner", www.wired.com, pp. 1–4, Dec. 1996.*

Moeller, Michael, "Engaging User Profiles on Web", www5.zdnet.com, pp. 1–2, Mar. 1997.*

Holloway, Marguerite, "Pattie", www.wired.com, pp. 1–7, Dec. 1997.*

Armando Fox and Eric A. Brewer, "Reducing WWW Latency and Bandwidth Requirements by Real–Time Distillation," Fifth International World Wide Web Conference, May 6–10, 1996.

Armando Fox et al., Adapting to Network and Client Variability via On–Demand Dynamic Distillation, University of Cal. at Berkeley, Sep. 1996.

*Primary Examiner*—Jason D. Cardone
(74) *Attorney, Agent, or Firm*—Kenyon & Kenyon

(57) ABSTRACT

A system for presenting dynamic content to a user of a client device is implemented in a method including the steps of presenting a requested data object to the user; and automatically presenting dynamic content to the user in addition to the presentation of the requested data object, wherein the dynamic content includes information provided by a dynamic executable module running on the client device.

19 Claims, 5 Drawing Sheets

U.S. PATENT DOCUMENTS

| | | | |
|---|---|---|---|
| 5,805,735 A | | 9/1998 | Chen et al. .................. 382/239 |
| 5,835,092 A | * | 11/1998 | Boudreau et al. ............ 345/347 |
| 5,848,246 A | * | 12/1998 | Gish ........................... 709/228 |
| 5,850,433 A | * | 12/1998 | Rondeua ..................... 379/201 |
| 5,861,883 A | * | 1/1999 | Cuomo et al. ............... 345/326 |
| 5,864,823 A | * | 1/1999 | Levitan ........................ 705/14 |
| 5,877,766 A | * | 3/1999 | Bates et al. .................. 345/357 |
| 5,905,492 A | * | 5/1999 | Straub et al. ................ 345/333 |
| 5,913,040 A | * | 6/1999 | Rakavy et al. ............... 709/232 |
| 5,918,013 A | * | 6/1999 | Mighdoll et al. ............ 709/217 |
| 5,918,014 A | * | 6/1999 | Robinson ..................... 709/219 |
| 5,931,901 A | * | 8/1999 | Wolfe et al. ................. 709/206 |
| 5,933,811 A | * | 8/1999 | Angles et al. ................ 705/14 |
| 5,937,392 A | * | 8/1999 | Alberts ........................ 705/14 |
| 5,944,791 A | * | 8/1999 | Scherpbier .................. 709/218 |
| 5,946,664 A | * | 8/1999 | Ebisawa ...................... 705/14 |
| 5,948,061 A | * | 9/1999 | Merriman et al. ........... 709/219 |
| 5,956,693 A | * | 9/1999 | Geerlings .................... 705/14 |
| 5,959,621 A | * | 9/1999 | Nawaz et al. ................ 345/733 |
| 5,961,603 A | * | 10/1999 | Kunkel et al. .............. 709/229 |
| 5,974,451 A | * | 10/1999 | Simmons .................... 709/218 |
| 5,995,943 A | * | 11/1999 | Bull et al. .................... 705/14 |
| 5,999,731 A | * | 12/1999 | Yellin et al. .................. 717/4 |
| 5,999,912 A | * | 12/1999 | Wodarz et al. ............... 705/14 |
| 6,006,252 A | * | 12/1999 | Wolfe .......................... 709/203 |
| 6,011,537 A | * | 1/2000 | Slotznick .................... 345/115 |
| 6,047,327 A | * | 4/2000 | Tso et al. .................... 709/232 |
| 6,049,821 A | * | 4/2000 | Theriault et al. ........... 709/203 |
| 6,052,717 A | * | 4/2000 | Reynolds et al. ........... 709/218 |
| 6,052,730 A | * | 4/2000 | Felciano et al. ............ 709/225 |
| 6,061,716 A | * | 5/2000 | Moncreiff ................... 709/204 |
| 6,065,024 A | * | 5/2000 | Renshaw .................... 707/513 |
| 6,073,167 A | * | 6/2000 | Poulton et al. ............. 709/206 |
| 6,073,241 A | * | 6/2000 | Rosenberg et al. ......... 713/201 |
| 6,094,655 A | * | 7/2000 | Rogers et al. ................ 707/10 |
| 6,108,637 A | * | 8/2000 | Blumenau ...................... 705/7 |

* cited by examiner

SYSTEM FOR DELIVERY OF DYNAMIC CONTENT TO A CLIENT DEVICE

This application claims the benefit of U.S. Provisional Application No. 60/041,001 titled "System for Targeted Delivery of Networked Content, filed Mar. 27, 1997 by Michael M. Tso et al. and assigned to Intel Corporation, the disclosure of which is expressly incorporated herein by reference.

BACKGROUND OF THE INVENTION

1. Field of the Invention

The present invention relates generally to the field of data communications for personal computers (PCs), and in particular to a system for delivering content, such as targeted on-line advertising, to a client device, where such delivery is not in response to a specific request for such content.

2. Related Art

The Internet is quickly becoming the preferred data communications medium for a broad class of computer users ranging from private individuals to large multi-national corporations. Such users now routinely employ the Internet to access information, distribute information, correspond electronically, and even conduct personal conferencing. An ever-growing number of individuals, organizations and businesses have established a presence on the Internet through "Web pages" on the World-Wide Web ("the Web").

As the popularity of the Internet has grown, so too have opportunities for on-line marketing. Advertising through the Internet has become enormously popular. Indeed, in some cases on-line services like e-mail are provided free of charge as long as users are willing to receive on-line advertisements.

On-line advertisements are typically included as an integral part of the content on Web pages. This approach suffers from a variety of limitations. For example, users tend to follow hyperlinks and move from one Web page to another, much like "surfing" the channels on a television. Unfortunately, such user behavior reduces the impact of advertising, as advertisements generally require captive audiences to be most effective. There is currently no reliable method for ensuring an Internet user's attention.

To illustrate another limitation, advertisers generally must purchase individual rights on particular Web pages to distribute their advertisements, since the link to an advertisement is authored into the content. This makes advertising sales a difficult proposition given the enormous number of Web pages on the Internet. Enterprises known as "consolidators," such as Doubleclick, purchase rights on certain pages and allow many advertisers to share the same space, but such approaches do not solve the fundamental problem that advertising space on each Web page must be individually acquired.

Yet another limitation of existing approaches to on-line advertising relates to difficulties in achieving so-called "targeted advertising," wherein advertisements are specifically tailored to the recipient's interests and preferences. Targeted advertising on the Internet has typically been attempted using a device known as a "cookie," which is a data item used to maintain client-specific information, such as a marketing profile, accessible by facilities that do not necessarily communicate with one another. For example, a cookie stored on a client device may be accessed by any number of Web sites which that client device visits, assuming those Web sites are preconfigured to do so. Unfortunately, propagating this type of functionality to the many thousands of Web sites on the Internet is impractical.

Another approach to targeted advertising on the Internet involves deriving profile information by analyzing the Web sites that particular users visit, as maintained in a standard logging device known as a "clickstream." Again, however, there is no one widely-implemented mechanism for collecting clickstreams. Even for those Web sites so-equipped, the current state of the art requires the resource-intensive task of merging logs from all of the sites visited by a user.

Still more limitations of existing approaches to on-line advertising relate to the nature of the on-line advertisements themselves. On-line advertisements are typically limited in richness due to unacceptable additional latencies that would be introduced by large or highly-rich advertisements. Also, since advertisements must be rendered by a browser installed on the client device, advertisers are restricted with respect to the use of more sophisticated, non-standard data formats and compression techniques. Only those datatypes supported by the browser may be used.

In view of the foregoing limitations, there is a need for a system capable of providing targeted distribution of content to network users without requiring widespread changes to existing network infrastructures.

SUMMARY OF THE INVENTION

An embodiment of the present invention is implemented in a method for presenting dynamic content to a user of a client device. According to that embodiment, a requested data object is presented to a user. Dynamic content is automatically presented to the user in addition to the presentation of the requested data object. The dynamic content comprises information provided by a dynamic executable module running on the client device.

DETAILED DESCRIPTION

Embodiments of the present invention provide a system for the targeted distribution of dynamic content without the limitations of existing approaches, such as those described above. For example, embodiments of the present invention may be applied to on-line advertising in a manner that significantly improves over existing technology, particularly with respect to distribution, targeting, and feedback collection. It should be noted, however, that the scope of the present invention extends well beyond on-line advertising. The same mechanisms and methods described herein may be advantageously applied to applications involving many different types of dynamic content including, but not limited to, subscription services (for example, news, weather, stock quotes), distribution of automatic software updates, or virtually any so-called "out of band" information (that is, information not directly associated with a user request which expects an immediate response, such as a deferred, periodic, or implicit user request). In other words, "dynamic content" as used herein refers broadly to content that is not specifically requested by a user. Thus, while the following detailed description is written in terms of on-line advertising applications, persons skilled in the art will recognize that the same or similar embodiments may be readily adapted for many other types of applications.

Figure 1:
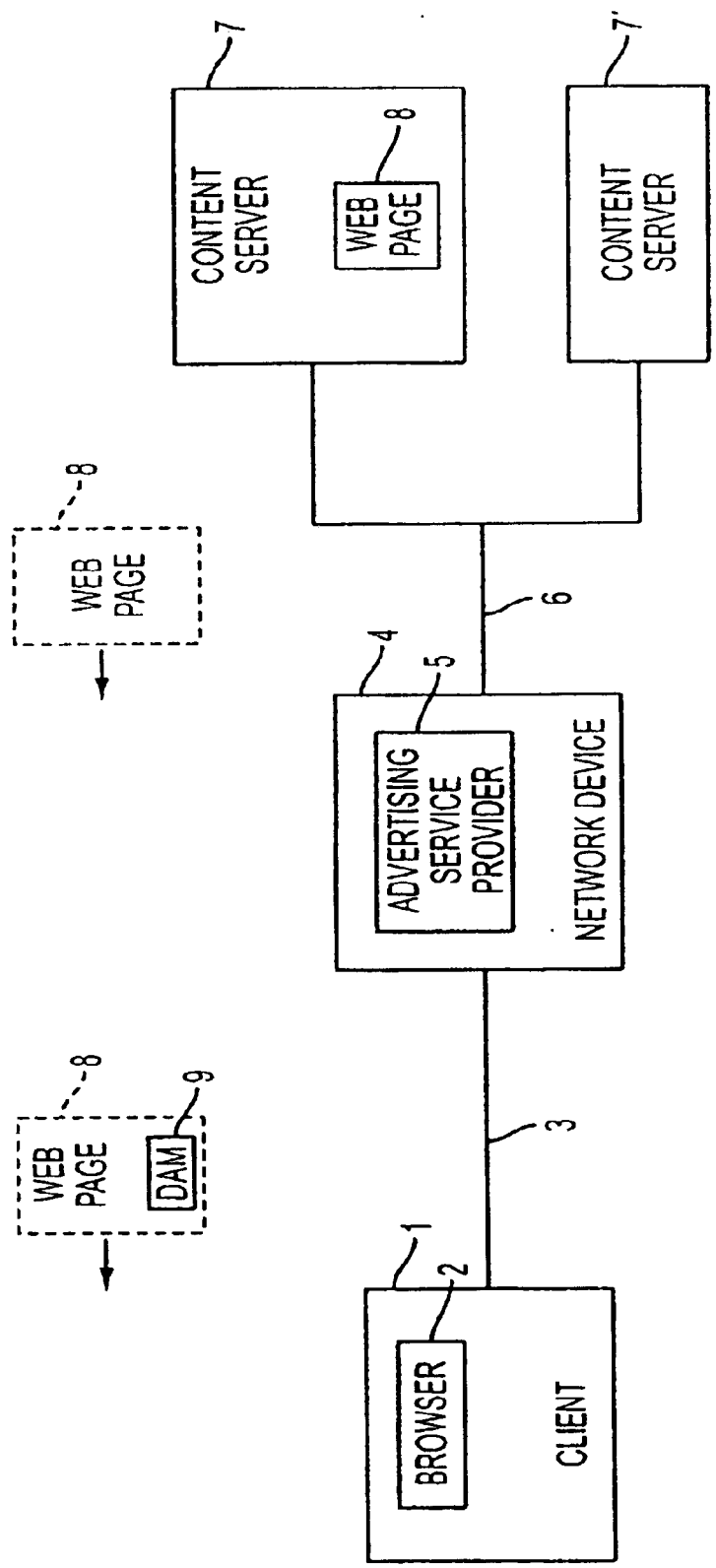
FIG. 1 is a schematic diagram illustrating a system for dynamic distribution of network content according to an embodiment of the present invention.

Looking now at a first embodiment of the present invention, illustrated in FIG. 1, a client device 1 may access a plurality of content servers 7 through a network device 4. Client device 1 includes a browser 2, such as Netscape™, which enables a user of client device 1 to retrieve and display network data objects, such as Web pages resident on content server 7. Content server 7 may reside, for example, on the Internet and be accessible through standard HTTP (HyperText Transfer Protocol) calls; however, the present invention is not limited to any particular network or communications method. In this particular embodiment, network device 4 is a network proxy through which a plurality of client devices 1 access network resources such as content servers 7. Alternatively, network device 4 may itself comprise a network server, a content server, or some other type of stand-alone computer or distributed system of computers coupled, for example, to an ISP's (Internet Service Provider's) network, a corporate network, or anywhere on the Internet. Although FIG. 1 illustrates only a single client device 1, network device 4 will typically be configured to provide multiple client devices with access to network resources.

Network device 4 includes an advertising service provider 5 responsible for managing the provision of dynamic content to client device 1. In this particular embodiment, advertising service provider 5 distributes advertising content to client device 1 by embedding a dynamic advertising module (DAM) 9 into one or more Web pages 8 downloaded to client device 1. Advertising service provider 5 may comprise a software module installed in, or otherwise executable by, network device 4. Dynamic advertising module 9 may comprise a dynamic executable module of a type known in the art implemented, for example, using a Java applet or similar utility, which automatically executes upon being loaded onto client device 1.

Dynamic advertising module 9 is programmed to control the display of advertising content on client device 1. An advantage of this approach, as opposed to having advertising service module 5 simply embed advertising content into Web page 8, is that most of today's common browsers will display information from such an embedded executable module in a window separate from a requested Web page. This not only eliminates any concerns about disrupting the layout of the Web page, but also provides a more aesthetically-appealing presentation. Another significant benefit provided by the use of dynamic advertising module 9 is that there is no need for client device 1 to be pre-configured with any special software to support the presentation of advertisements.

In possible variations of the embodiment illustrated in FIG. 1, network device 4 may be configured to ensure that only a single instance of dynamic advertising module 9 is active on client device 1. Moreover, where client device 1 includes a local cache storage (not shown) accessible by browser 2, network device 4 may be configured to avoid downloading another instance of dynamic advertising module 9 if one already resides in the cache.

Figure 5:
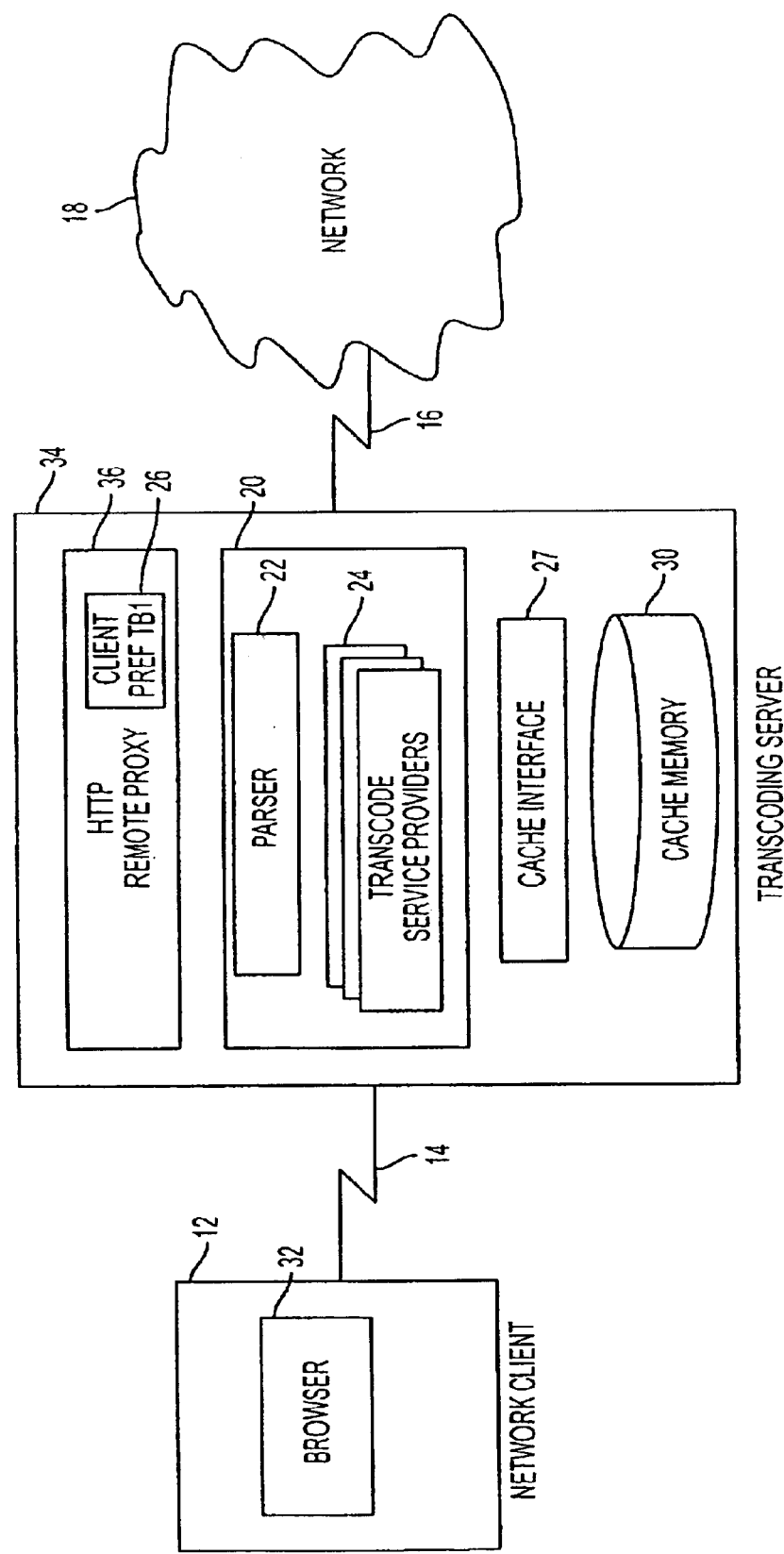
FIG. 5 is a schematic diagram illustrating a configuration in which an embodiment of the present invention may be implemented.

The foregoing embodiments may be implemented, for example, as part of a system for dynamically transcoding network content. With reference to FIG. 5, network client 12 communicates with an external network 18 through a transcoding server 34. Network client 12 includes a browser 32, such as the Netscape Navigator v.3.0 browser (although the invention is not limited in this respect), which manages the presentation of data to a user. In the illustrated arrangement, network client 12 is "non-enabled," meaning no specialized transcoding software is preloaded on network client 12. Network 18 may comprise, for example, the Internet. In this particular arrangement, network client 12 communicates requests for information to, and receives information from, transcoding server 34 over a client/server communications link 14. Transcoding server 34 in turn communicates with computers resident on network 18 through server/network communications link 16. The respective communications links 14, 16 may comprise any suitable communications media known in the art.

Transcoding server 34 may be configured to provide a wide variety of transcoding services to network client 12 and/or network devices, such as content servers, with which network client 12 communicates. In this context, the term "transcode" refers to virtually any type of addition, deletion or modification of data transmitted to or from network client 12 by or through transcoding server 34. In addition to the provision of dynamic content such as advertising, examples of such transcoding services include data compression, image scaling, and dynamic removal of predetermined content. In the context of the present invention, the provision of dynamic content may be the only transcoding service provided to a particular client device, or may be only one of a variety of services.

As illustrated in FIG. 5, transcoding server 34 may include a transcoder 20 with a parser 22 and a plurality of transcode service providers 24. Parser 22 is configured to act upon data received by transcoder 20, such as a request for a network object generated by client device 12 or a reply to such a request provided by a content server or other device on network 18. In this particular example, parser 22 is responsible for selectively invoking one or more of transcode service providers 24 based upon a predetermined selection criterion. With reference to FIG. 1, advertising service provider 5 may be implemented, for example, as a transcoding service provider 24.

In the arrangement shown in FIG. 5, transcoding server 34 includes an HTTP (HyperText Transfer Protocol) remote proxy 36, capable of accessing network 18 over server/network communications link 16. HTTP remote proxy 36 provides functionality different from known network proxies, which generally are little more than a conduit for requests to, and replies from, external Internet resources, in that it is capable not only of examining such requests and replies, but also of acting upon commands in the requests by, for example, determining whether or not to transcode content. Moreover, using transcoder 20, HTTP remote proxy 36 is capable of changing content received from network 18 prior to returning it to a requesting network client 12.

Looking more closely at the arrangement shown in FIG. 5, transcoder 20 is coupled to HTTP remote proxy 36. Parser 22 manages the transcoding of data to be transmitted from transcoding server 34 to network client 12. To this end, parser 22 controls transcode service providers 24 to selectively transcode content based on a predetermined selection criterion. For example, one or more transcode service providers 24 may provide the capability to compress and/or scale different types of data content, such as image, video, or HTML (HyperText Markup Language), in addition to providing content blocking functionality as discussed above. Transcoding server 34 may also include a server-side cache memory 30 managed by a server-side cache interface 28. Server-side cache memory 30 may be used to store both original and transcoded versions of content for later transmission to network client 12 without the need to re-retrieve the content from network 18 or to re-transcode the content.

Parser 22 may comprise a relatively simple, uniform interface to HTTP remote proxy 36, and may provide an API (Application Programming Interface) for transcoding data received by HTTP remote proxy 36. Parser 22 manages one or more transcode service providers 24 that are accessed through a common SPI (Service Provider Interface). In this particular implementation, parser 22 is designed in compliance with the Windows Open Systems Architecture (WOSA), and may be implemented as a Win32 DLL (Dynamic Link Library). The WOSA architecture, described in *Readings on Microsoft Windows and WOSA* (Microsoft Corp. 1995), enables additional transcode service providers 24 to be dynamically added to the system to provide new features and/or better transcoding algorithms, while at the same time not requiring changing or retesting other software components in the system.

Like parser 22, server-side cache interface 28 may be modeled after a standard Get/Set interface. Server-side cache memory 30 essentially "owns" all cached objects, in that it manages the properties and storage of the objects and may invalidate any non-locked object at any time; however, the actual format of any given cached object is known only by parser 22 and its associated transcode service providers 24. Thus, for data integrity and transcoding efficiency purposes, all access to server-side cache memory 30 in this arrangement is through parser 22.

In operation, transcoder 20 may use a Read( ) call to read data from a specified cached object data stream. For example, transcode service provider 24 may invoke this call and tunnel stream data through HTTP remote proxy 36 directly to network client 12. Similarly, a Write( ) call may be used to cache data from a new HTTP data stream. This call will append an incoming data stream received from, for example, a Web server or transcode service provider 24, to an opened cache stream which may be concurrently read using the Read( ) call.

Parser 22 may be configured to include the following calls:
GetObject(URL, InParams, & OutParams, &OutStream, . . . );
GetScaledObject(URL, InParams, &OutParams, &OutStream, Stage, . . . );
PutObject(URL, InParamStruct, &InStream, &OutParams, &OutStream, . . . ).

Parser 22 may use such calls to manage the provision of requested content to network client 12. For example, the GetObject( ) call may be used to service non-enabled client requests, and returns a non-transcoded (original) version of a specified hypertext object. In this arrangement, transcoding server 34 assumes that each HTTP request has a unique thread that may be blocked until the request is satisfied. Accordingly, the GetObject( ) call will block until it either returns the requested data stream or indicates failure with a cause (e.g., object does not exist). This ability to return a so-called standard hypertext object is advantageous for compatibility reasons, enabling embodiments of the present invention to be used with existing browsers that do not include support for certain transcoding functionality (e.g., advanced data compression), and enabling users to selectively retrieve non-transcoded versions.

The GetScaledObject( ) call is similar to GetObject( ), and is also used to request an object from server-side cache memory 30; however, it adds support for requesting a particular version of that object, such as a high-quality rendition. Unlike traditional caching proxies, transcode service providers 24 can use server-side cache memory 30 to store several different versions of an object to support clients with different communications and/or presentation capabilities. Thus, an additional "Stage" parameter may be used to indicate which version of the cached object is to be returned to network client 12. Where transcode service provider 24 is configured to scale network content, it may use this parameter to request a version of a cached object having, for example, a default scaled quality, a refinement to a better-quality version, or the original non-scaled version.

In this particular arrangement, when network client 12 requests a hypertext object, HTTP remote proxy 36 uses either the GetObject( ) or GetScaledObject( ) call (depending on if network client 12 is capable of receiving scaled/transcoded datatypes) to retrieve the hypertext object from parser 22. If the hypertext object is not found, parser 22 uses the CreateEntry( ) call to create an entry (in effect, a placeholder) in server-side cache memory 30 for the new object. The new entry is returned to HTTP remote proxy 36, which requests the hypertext object from network 18. As a data stream for the hypertext object is returned, HTTP remote proxy 36 calls parser 22 using the PutObject( ) call, passing into this call the new entry and the handle to the data stream to be placed into the entry. Parser 22 selects an appropriate transcode service provider 24 based, for example, on the content type of the data stream. In this context, the term content type encompasses a datatype, an HTTP MIME (Multipurpose Internet Mail Extensions) type, a content format, and so on. The selected transcode service provider 24 uses a separate thread to read the incoming data stream, transcode it (for example, scan for predetermined content and delete it if found), and place it within the entry of server-side cache memory 30. The current thread immediately returns to HTTP remote proxy 36, which once again calls GetScaledObject( ) (or GetObject( ). This case will always result in a cache hit. This thread then works simultaneously with the separate thread in the PutObject( ) to tunnel data (either original or transcoded) from transcoding server 34 to network client 12.

As discussed further herein, the configuration shown in FIG. 5 is just one of many different ways in which embodiments of the present invention may be implemented. For example, the dynamic content provisions functionality could be implemented in a so-called "enabled client" containing specialized software for performing the functions attributed to dynamic advertising module 9 in FIG. 1. Similar to the configuration of FIG. 5, such specialized software may be implemented, for example, as a client-side transcode service provider, as part of a local proxy, as part of the browser running on the client device, or as an add-in module running on the client device. The present invention is not limited in this regard.

Figure 2:
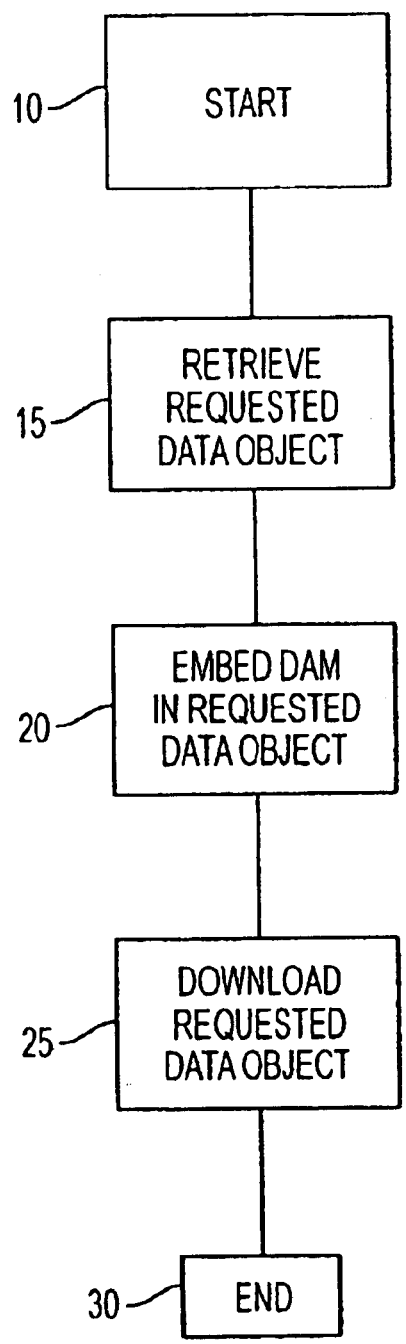
FIG. 2 is a flow diagram illustrating a method for dynamic distribution of network content according to an embodiment of the present invention.

By way of further illustration, FIG. 2 provides a flow diagram illustrating a method for distributing content using, for example, a system such as that of FIG. 1 or FIG. 5. According to this embodiment, processing may begin upon receipt of a data object, such as a data stream representing a requested Web page, to be downloaded to client device 1 (Step 15). Prior to downloading the data object, the device performing the method, such as network device 4, embeds code into the data object to provide dynamic advertising content (Step 20). This code may comprise, for example, dynamic advertising module 9 of the embodiment illustrated in FIG. 1. The data object with the embedded code is then downloaded to client device 1 (Step 25). In a variation on this embodiment, network device 4 may be configured to determine whether client device 1 is to receive dynamic advertising content. Such a determination may be performed either upon receipt of a request for a data object from client device 1, or upon receipt of the beginning of a response to such a request from content server 7. Such a determination may be based upon, for example, an authorization table maintained or otherwise accessible by advertising service provider 5.

Figure 3:
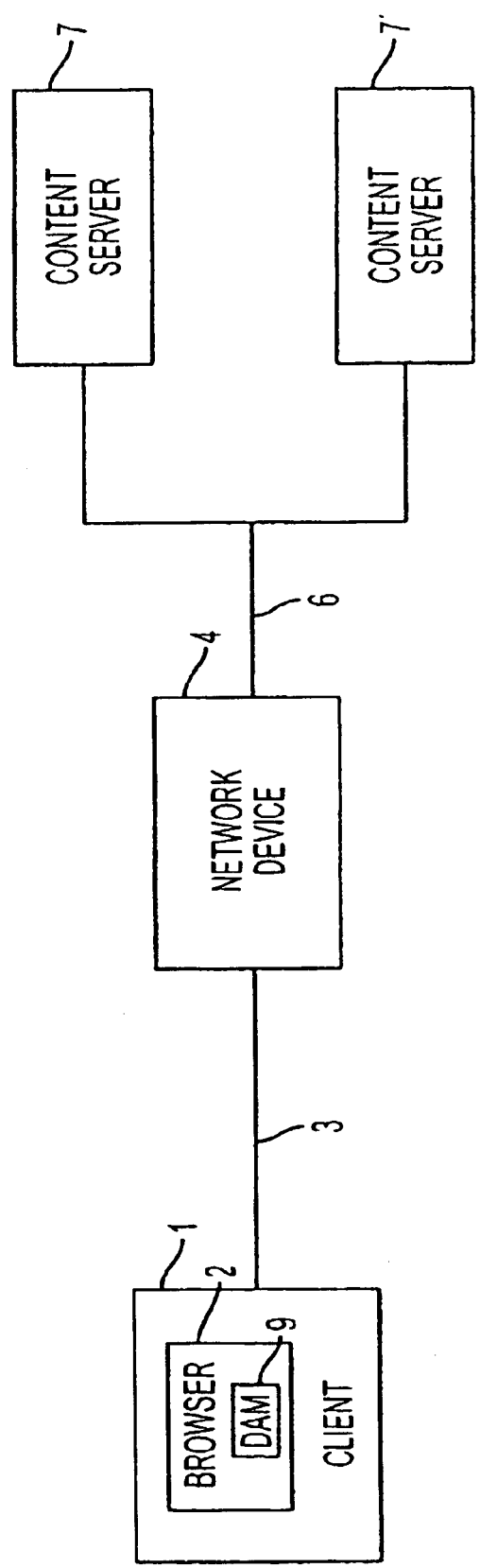
FIG. 3 is a schematic diagram illustrating a system for dynamic distribution of network content by a browser according to an embodiment of the present invention.

According to another embodiment of the present invention, illustrated in FIG. 3, browser 2 of client device 1 includes a dynamic advertising module 9 which essentially integrates into browser 2 the functionality described above for the dynamic advertising module 9 of FIG. 1. Dynamic advertising module 9 may be implemented, for example, as a software routine within browser 2, or as a separate executable module which browser 2 may invoke. In this way, browser 2 may be configured to render advertisements as it displays user-requested content. In addition, dynamic advertising module 9 may cause browser 2 to fetch advertisements from one or more network locations.

Figure 4:
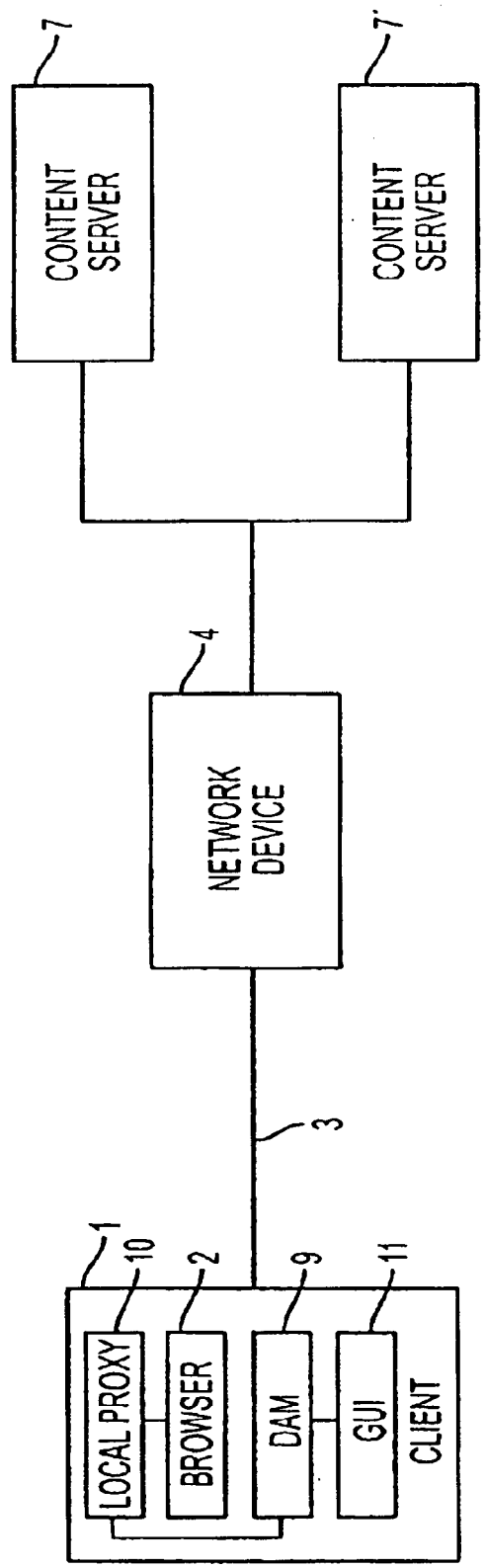
FIG. 4 is a schematic diagram illustrating a system for dynamic distribution of network content by an enabled client device according to an embodiment of the present invention.

According to yet another embodiment, illustrated in FIG. 4, client device 1 may be a so-called "enabled client," whereby dynamic advertising functionality such as that described above is provided through specialized software installed on client device 1. In this embodiment, client device 1 includes a local proxy 10 coupled to browser 2 which intercepts all network communications to or from client device 1. Client device 1 also includes a dynamic advertising module 9 coupled to a graphical user interface (GUI) 11 capable of displaying so-called "rich" advertisements (that is, high-quality content) represented in datatypes which may not be supported by browser 2. Local proxy 10 is configured to maintain contact with network device 4 in the same manner as dynamic advertising module 9 of the FIG. 1 embodiment; however, since local proxy 10 intercepts all requests issued by browser 2, a significant portion of the work that network proxy 4 might otherwise be required to do, such as recording clickstreams, can be handled at the client-level by local proxy 10 and/or dynamic advertising module 9. Such an approach is especially advantageous where overall system performance may be improved by off-loading work from network proxy 4, such as where network proxy 4 services a large number of client devices.

Among the features which may be provided by particular embodiments of the present invention, including those illustrated in FIGS. 1–5, is session-based advertising. The goal of session-based advertising is to provide an advertiser with a relatively "captive" viewing audience for advertising content. With reference to the embodiment illustrated in FIG. 1, session-based advertising may be implemented by coding advertising service provider 5 and/or dynamic advertising module 9 to fetch and display advertisements from one or more predetermined network locations using, for example, standard HTTP calls. Dynamic advertising module 9 may then control how long an advertisement is displayed, regardless of which Web page(s) 8 the user visits through browser 2. The fetching and/or display of advertisements may be based upon an existing user profile maintained, for example, in a user profile table (not shown) accessible by advertising service provider 5. The advertiser is thus given the closest thing possible to a captive audience, since the targeted advertising can be constantly displayed even when the user rapidly changes the content being viewed. Moreover, since the content displayed by dynamic advertising module 9 appears regardless of what Web page 8 the user is viewing, there is no need for the advertiser to request any content changes from particular content providers in order to display their advertisements.

In possible variations of this embodiment, dynamic advertising module 9 may be configured to maintain contact with advertising service provider 5 (for example, through HTTP "POST" messages) so that the advertisements displayed reflect any changes in the original user profile resulting from activities during the current session. In other words, the user profile may be updated as a result of the user's activities during the current session, and those updates may be reflected in the dynamic content presented during that session. Advertising service provider 5 may also set and/or change configuration information controlling the operation of dynamic advertising module 9, such as how long to display each advertisement. It is also possible to integrate existing on-line advertising techniques into dynamic advertising module 9, such as the feature of known banner advertisements which enables users to click on an advertisement to access a location on the network predetermined by the advertiser, such as the advertiser's corporate presence server.

As alluded to above, it may be beneficial to collect and record clickstreams for individual users for purposes of developing and/or updating user profiles useful in highly-targeted advertising. This may be done, for example, by a browser, a local proxy, a network proxy, or a content server. It may be preferable, however, to implement such a feature in a network proxy (such as that shown in FIG. 1) to avoid having to modify existing client- or server-side devices. Another advantage of the network proxy approach, at least compared with a server-based approach, is the elimination of the sometimes difficult task of having a content server determine which logs correspond to particular users. The difficulty arises because IP addresses are often dynamically assigned on a per request basis, meaning a particular user's requests over the course of a single session may reach a content server with a number of different IP addresses. By contrast, according to the proxy-based embodiments discussed herein, a unique IP address may be assigned and used for all requests during any particular user session, making the clickstream collection and recording mechanism straight-forward and accurate.

As a further refinement providing even greater targeting capabilities, the clickstream gathering mechanism may be configured to weight a user's interest in particular Web pages or Web sites (that is, a group of pages from the same Internet domain). For example, network device 4 of FIG. 1 may be programmed to measure a user's interest by how long the user spends looking at a particular Web page or site. This information may be derived from the HTTP transactions between client device 1 and content server 7, such as by timestamping requests received from client device 1 in a log maintained by network device 4. Such a feature is most advantageously provided with either a proxy-based or a browser-based implementation because such implementations enable an accurate account of every request issued from client device 1. By contrast, currently-known approaches using server-side logs do not work as well because server logs cannot easily detect the "click" by which the user leaves the current server (rather, it will generally only be detected by the new server to which the user goes). Similarly, user interest may be measured by how many hyperlinks the user follows from the same Web page or site, and/or how frequently the user visits a particular Web page or site over time. To facilitate such features, network device 4 may be configured to maintain a user history log including entries for each user to which dynamic advertising content is provided.

Where a measurement mechanism is provided for tracking how long a user spends at a particular Web page or site, the mechanism may include a timeout facility for ignoring out-of-bounds values which might otherwise skew results. A suitable timeout period may be on the order of five minutes for any particular Web page. Such a timeout feature is beneficial to ensure that the Web page which a user last looks at before he/she turns off their system (or leaves for an extended period of time) does not get misinterpreted as the user having spent an extremely long time looking at that page.

In one particular implementation of a time-based weighting feature, network device 4 may be programmed to perform the following time-stamping algorithm:

1. When a requested data object is received for downloading to client device 1, record the current object ID (for example, a URL (Uniform Resource Locator)) and the current time.
2. Compare the current time with the time recorded for the previous data object received. If the difference is not greater than a predetermined timeout value, record the difference with the previous object ID; else, record "0" with the previous object ID.

It will generally be sufficient to limit timestamping activities to the receipt of ".HTML" files, thereby minimizing the number of entries caused by multiple objects (for example, images) that may be part of the same HTML page. For analytical purposes, the time between "0" and the timeout period may be divided into several slots (for example, 0–1 minute may be designated "little/no interest," 1–2 minutes "moderate interest," 2–3 minutes "very interested," and so on).

Another advantageous feature which may be provided by embodiments of the present invention, including those illustrated in FIGS. 1–5, is the ability to download dynamic content to client device 1 primarily in a background mode, thereby avoiding the introduction of excessive latency into downloads of "regular" (that is, specifically requested) user content as a result of the addition of advertising information. In essence, the goal is to prevent competition between advertisements and user-requested content during data transfers to client device 1. As one example of how this goal may be achieved, dynamic advertising module 9 (whether resident in browser 2 or elsewhere in client device 1) may generate requests for advertising content to be displayed using a distinguishable request (for example, a particular "POST" message, a regular HTTP "GET" with a particular URL, or any other form of predetermined inter-device communication). Network device 4 will then be able to distinguish requests for advertisements (or any other low-priority content) from user-initiated content requests (or any other high-priority content), and ensure that user-initiated content requests always get processing preference.

According to a particular implementation of this feature, network device 4 maintains state information about all of the advertisement requests being currently processed (for example, a list of sockets being used for data transfer). This information may be keyed by a unique identifier for each client device 1, such as an IP address. Each new connection accepted by network device 4 may then be categorized either as an advertisement request or as a user content request. If the former, the request is added to the list and processed if no other high-priority requests are being processed; otherwise, the network device 4 may systematically abort all other low-priority requests and begin processing the higher-priority request. In such a case, the low-priority requests will have to be restarted at a later time, either by network device 4 or by dynamic advertising module 9. Alternatively, rather than aborting the low-priority requests, network device 4 may temporarily suspend all processing related to low-priority requests and begin processing the higher-priority content request. The suspended request may remain unprocessed until all outstanding high-priority content requests have been satisfied. This alternative has the advantage of making more efficient use of network resources by not discarding partially-transferred content and maintaining the state of the connection (thus saving overhead required for setting up new connections).

The just-described approaches for background processing may be implemented using existing protocol stacks. A possible alternative approach takes advantage of overlapped input/output features that are available in some protocol stack implementations, such as Winsock2. Such an alternative approach provides a more fine-grained priority than the methods just described by waiting for the completion of each high-priority send operation instead of waiting for the end of the high-priority socket. This mechanism makes use of the feature in such protocol stacks which notifies the calling application when each send operation completes. Low-priority (or out of band) send operations can be delayed until all (or most) previous high-priority send operations are completed. Thus, both high- and low-priority sockets may be opened simultaneously, but low-priority data is only sent when the in-band socket goes idle (for example, due to server or network congestion). This is especially useful for embedded content streams such as video or persistent HTTP streams. Other optimizations are also possible, such as multiple priority levels, or anticipating socket/send completion based on average data throughput. This solution increases utilization of the communications link to the user without increasing user-visible latencies.

Another benefit provided by embodiments of the present invention is that it becomes possible to provide richer advertising content than is practical with existing on-line advertising methods. Since advertising need not add additional latency to the user's browsing, it is practical to download dynamic content including arbitrary complex objects, such as executables, as well as graphical or other multimedia data. For example, an embodiment of the present invention may be used to download a demo version of a software program being advertised, enabling the user to click on the advertisement and instantly try out the demo without waiting for the demo to be downloaded. Similarly, a preview clip of a music CD or movie may be shown to a user after it has been completely downloaded. Likewise, a "floating" animation (that is, one not framed in a window) that the user can interact with while browsing may be provided in the manner of a screen-saver. Thus, advertisements can be very interactive and very rich, greatly increasing their effectiveness. Moreover, rich advertisements may be further improved by installing software, such as an advertisement player, on a client machine. This would permit downloading only data (for example, sound, images) and instructions on how to playback the data. Savings in download time can then be realized because the player would contain most of the executable code that would otherwise have to be downloaded with every advertisement.

Embodiments of the present invention likewise enable advertisements to be targeted to a degree not readily achievable with existing technology. Whether the mechanisms are implemented in a network device or in client-based software, a wide variety of targeting criteria are possible. For example, targeting may be based upon a list of Web pages for which demographic data is available. To illustrate, it is known that a high percentage of visitors to the Dilbert™ cartoon page are white-collar office workers, who may be good candidates to receive advertisements for such items as luxury cars. Targeting may also be based on keywords in the content page, the request, or the URL accessed. A proxy (local or network) may scan for predetermined keywords and then decide which category of advertising to request. For example, if a user is viewing a Web page containing many occurrences of the words "stock" and "trade," the user would likely be a good candidate for a discount brokerage advertisement. Unlike existing mechanisms that scan requests for keywords, embodiments of the present invention do not require any special software on the content server.

Targeting may also be based on user profile information. Such information may be collected through any of a wide variety of known methods, such as personal surveys or clickstream analysis, and then used to match profiles requested by advertisers. Embodiments of the present invention enable any advertiser to use this type of targeting capability on any Web page, regardless of whether the Web page already has a hyperlink to another advertiser or group of advertisers, since the matching may be done at the proxy (and possibly completely independent of the content). Targeting may also be based on recently-installed and/or frequently-used client-based applications. For example, software on a client machine can gather information by examining the client system (for example, the Windows registry and/or file system on PCs) for the date when applications were installed (or are frequently run). This enables advertisers to target advertisements for software add-ons, upgrades, and related products.

Yet another possibility is targeting based on client computer capabilities. For example, the client machine may be queried for its media and processing capabilities (for example, by looking at which type of software device drivers are loaded/active). This allows rich content to be customized for each user's computer capabilities to prevent instances where the client is unable to consume all of the data transferred due to system limitations, such as advertisements with audio or those requiring high-resolution video being downloaded to clients lacking the capability to render such content. It should be noted that the foregoing targeting possibilities are presented only by way of example, and not by way of limitation.

Embodiments of the present invention may be distributed, for example, as a set of instructions residing on a storage medium. Such a storage medium might be a memory of a computer; a piece of firmware; a portable storage device, such as a diskette or other magnetic storage device, or a CD-ROM; or any other medium on which it is known to store executable instructions.

Although the present invention has been described largely with reference to embodiments for processing requests for data from the Internet, persons skilled in the art will recognize that it is equally applicable to other networking environments. For example, embodiments of the present invention may be used to distribute dynamic content to users on an "intranet." An intranet typically is a secure corporate network modeled after the Internet architecture, and generally includes mechanisms for communicating with external networks such as the Internet.

The foregoing is a detailed description of particular embodiments of the present invention. The invention embraces all alternatives, modifications and variations that fall within the letter and spirit of the claims, as well as all equivalents of the claimed subject matter. For example, the foregoing embodiments need not be implemented in network devices which communicate using HTTP. The same methods described herein may be applied to any network element capable of intercepting network requests, such as protocol stacks on clients, servers, proxies or routers, or in specially-configured routers or other specially-built hardware which can intercept packets transmitted over a network. Likewise, the gathering of user profile information and demographics (for example, clickstreams) may also be done at the client using either local software or an enhanced browser. Persons skilled in the art will recognize from the foregoing detailed description that many other alternatives, modifications and variations are possible.

What is claimed is:

1. A method for the targeted distribution of dynamic content to a client device configured to access the Internet through a network proxy, said method comprising the steps of:

receiving at a network proxy a request by the client device to retrieve a first web page;

retrieving the first web page;

embedding a dynamic executable module in the first web page, the dynamic executable module comprising executable instructions;

downloading the first web page with the embedded dynamic executable module to the client device;

executing the dynamic executable module to retrieve dynamic content from the network proxy, said execution and retrieval being transparent to a user of the client device and not interfering with servicing of requests for one or more additional web pages; and displaying the retrieved dynamic content on the client device concurrently with one or more web pages requested by the client device, wherein the dynamic content is selected in accordance with user profile information.

2. The method of claim 1, wherein said user profile information comprises information derived from a plurality of web pages retrieved by the client device.

3. The method of claim 2, wherein said user profile information further comprises a measure of user interest in a requested web page.

4. The method of claim 3, wherein said measure of user interest is derived from a period of time the user viewed the requested web page.

5. The method of claim 3, wherein said measure of user interest is derived from a number of times the user accessed the requested web page.

6. The method of claim 2, further comprising the step of updating said user profile information in accordance with one or more requested web pages.

7. The method of claim 2, wherein said dynamic content comprises advertising information associated with an advertiser, said method further comprising the step of providing said user profile information to the advertiser.

8. The method of claim 1, wherein said user profile information comprises a capability of the client device.

9. The method of claim 1, wherein said user profile information comprises information provided by the user of the client device.

10. A network proxy for disseminating dynamic content to a user of a client device, the network proxy being coupled between the client device and the Internet and comprising a set of executable instructions residing on a storage medium, the set of executable instructions including instructions for:

receiving from the client device a request for a data object resident on a content server;

retrieving the requested data object from the content server;

embedding a dynamic executable module in the requested data object, wherein the dynamic executable module comprises executable instructions configured to retrieve dynamic content from the network proxy in a manner that is transparent to the user and does not interfere with servicing of requests for additional data objects, and to present dynamic content to the user concurrently with one or more requested data objects;

downloading the requested data object with the embedded dynamic executable module from the network proxy to the client device; and executing the dynamic executable module to retrieve and present dynamic content to the user.

11. The network device of claim 10, wherein the dynamic content comprises advertising information.

12. The network device of claim 11, wherein the advertising information is associated with user profile information obtained by the dynamic executable module.

13. A method for presenting dynamic content to a user of a client device, wherein the client device is configured to access a plurality of content servers through a network proxy, said method being performed by the network proxy and comprising the steps of:

receiving at the network proxy a request for a first data object from a user of the client device;

retrieving the first data object from a content server;

embedding a dynamic executable module in the first data object, the dynamic executable module comprising executable instructions;

downloading the first data object with the embedded dynamic executable module from the network proxy to the client device;

executing the dynamic executable module to retrieve dynamic content from the network proxy, said execution and retrieval being transparent to a user of the client device and not interfering with servicing of additional requests for data objects by the user; and presenting the retrieved dynamic content to the user concurrently with one or more data objects requested by the user, wherein said dynamic content comprises information that was not requested by the user.

14. The method of claim 1, wherein said dynamic content comprises advertising information.

15. The method of claim 1, wherein said dynamic executable module is further programmed to selectively retrieve said dynamic content in accordance with user profile information.

16. The method of claim 1, further comprising the step of determining whether the client device is preconfigured to receive the dynamic content.

17. A storage medium containing a set of instructions for presenting dynamic content to a user of a client device configured to access a plurality of content servers through a network proxy, said set of instructions including instructions for:

receiving at the network proxy a request for a first data object from a user of the client device;

retrieving the first data object from a content server;

embedding a dynamic executable module in the first data object, the dynamic executable module comprising executable instructions;

downloading the first data object with the embedded dynamic executable module from the network proxy to the client device;

executing the dynamic executable module to retrieve dynamic content from the network proxy, said execution and retrieval being transparent to a user of the client device and not interfering with servicing of additional requests for data objects by the user; and presenting the retrieved dynamic content to the user concurrently with one or more data objects requested by the user, wherein said dynamic content comprises information that was not requested by the user.

18. The storage medium of claim 16, wherein said storage medium comprises a magnetic storage device.

19. The storage medium of claim 16, wherein said storage medium comprises a magnetic storage device.

* * * * *

UNITED STATES PATENT AND TRADEMARK OFFICE
CERTIFICATE OF CORRECTION

PATENT NO. : 6,892,226 B1
DATED : May 10, 2005
INVENTOR(S) : Michael M. Tso et al.

It is certified that error appears in the above-identified patent and that said Letters Patent is hereby corrected as shown below:

<u>Column 14,</u>
Lines 8 and 10, replace "of claim 1" with -- of claim 13 --.
Lines 43 and 45, replace "of claim 16" with -- of claim 17 --.

Signed and Sealed this

Twenty-fifth Day of October, 2005

JON W. DUDAS
*Director of the United States Patent and Trademark Office*